United States Patent
Ang et al.

(10) Patent No.: US 7,042,910 B2
(45) Date of Patent: May 9, 2006

(54) CLOCK SIGNAL DECOUPLING FOR SYNCHRONOUS OPERATION

(75) Inventors: Oon-Sim Ang, Vancouver (CA); Barry Kazuto Tsuji, Burnaby (CA); Oreste Basil Varelas, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 09/930,102

(22) Filed: Aug. 14, 2001

(65) Prior Publication Data

US 2002/0172225 A1    Nov. 21, 2002

Related U.S. Application Data

(63) Continuation-in-part of application No. 09/862,141, filed on May 21, 2001.

(51) Int. Cl.
*H04J 3/06* (2006.01)
(52) U.S. Cl. ............... 370/503; 370/516; 370/518
(58) Field of Classification Search ........... 370/395.52, 370/503–507, 391, 516, 518, 395.62; 398/155
See application file for complete search history.

(56) References Cited

U.S. PATENT DOCUMENTS

| | | |
|---|---|---|
| 5,210,762 A | 5/1993 | Weeber et al. |
| 5,465,252 A | 11/1995 | Muller |
| 5,535,219 A | 7/1996 | Freitas |
| 5,717,693 A | 2/1998 | Baydar et al. |
| 5,809,032 A | 9/1998 | Weeber et al. |

(Continued)

FOREIGN PATENT DOCUMENTS

EP    0 705 050 A2    4/1996

(Continued)

OTHER PUBLICATIONS

Fuqiang, S. et al., "A SDH STM-N Processor for Overhead Terminating and PDH Interface," High Technology Letters, vol. 5, No. 1, pp. 25-28, Jun. 1999.

(Continued)

*Primary Examiner*—Hassan Kizou
*Assistant Examiner*—Habte Mered
(74) *Attorney, Agent, or Firm*—Grossman, Tucker, Perreault & Pfleger, PLLC (57) ABSTRACT

Method and apparatus is described for decoupling data from a clock signal and recoupling the data to a different clock signal for subsequent synchronous processing by a pointer processor. More particularly, on a receive or drop side, one buffer is configured to store payload pointers and a synchronous payload envelope arriving clocked by a line clock signal, while another buffer is configure to store TOH or SOH arriving clocked by the line clock signal. Each buffer clocks out such stored information off of a same system clock signal, such as a drop clock signal. On a transmit or add side, a buffer is configured to store payload pointers and a synchronous payload envelope. This buffer clocks in such stored information off of a system clock signal, such as an add clock signal, and clocks out such stored information off of a transmit reference clock signal. Output of such buffers, whether on a drop or add side, is provided to a pointer processor buffer, where both an input side and an output side of the pointer processor buffer are operated off of a system clock signal or a signal synchronized with the system clock signal.

23 Claims, 9 Drawing Sheets

U.S. PATENT DOCUMENTS

| | | | |
|---|---|---|---|
| 5,898,887 A | | 4/1999 | Hansen |
| 5,907,682 A | * | 5/1999 | Miyazawa ................. 709/230 |
| 5,923,653 A | | 7/1999 | Denton |
| 6,188,685 B1 | * | 2/2001 | Wolf et al. ................. 370/378 |
| 6,314,097 B1 | | 11/2001 | Ohara |
| 6,526,069 B1 | * | 2/2003 | Wolf et al. ................. 370/503 |
| 6,693,918 B1 | * | 2/2004 | Dallabetta et al. .......... 370/503 |
| 6,697,386 B1 | | 2/2004 | Sugawara et al. |
| 6,765,928 B1 | * | 7/2004 | Sethuram et al. ........... 370/476 |
| 2003/0031204 A1 | | 2/2003 | Ho et al. |
| 2004/0174870 A1 | | 9/2004 | Viks et al. |

FOREIGN PATENT DOCUMENTS

| | | |
|---|---|---|
| WO | WO 96/41435 | 12/1996 |
| WO | WO 02/095999 A2 | 11/2002 |

OTHER PUBLICATIONS

Hamlin, R. et al., "A SONET/SDH Overhead Terminator for STS-3, STS-3C, and STM-1," IEEE Journal of Solid-State Circuits, vol. 28, No. 3, pp. 276-281, Mar. 28, 1993.

European Patent Office, International Search Report for International Appl. No. PCT/CA01/01105, 9 pages, Nov. 26, 2002.

European Patent Office, International Preliminary Examination Report for International Appl. No. PCT/CA01/01105, 8 pages, Sep. 5, 2003.

U.S. Appl. No. 10/954,947, filed Sep. 29, 2004, Ho et al.

"International Search Report and Written Opinion of the International Searching Authority; Dated Jan. 17, 2006; PCT/US2005/035378", (Jan. 17, 2006), 12 pgs.

* cited by examiner

CLOCK SIGNAL DECOUPLING FOR SYNCHRONOUS OPERATION

CROSS-REFERENCE TO RELATED APPLICATION(S)

This application is a continuation-in-part of co-pending U.S. patent application entitled "Method and Apparatus for Frame-Based Protocol Processing" to Oreste Basil Varelas and Barry Kazuto Tsuji, named inventors herein, application Ser. No. 09/862,141, filed May 21, 2001, and assigned to the same assignee, which is incorporated by reference as though fully set forth herein.

BACKGROUND OF THE INVENTION

1. Field of the Invention

This invention relates to clock signals in communication networks, and, more particularly, to clock signal decoupling for clock signal alignment for synchronous operation.

2. Description of the Related Art

To accommodate increasing demand for bandwidth, optical networking has become more prevalent. Two well-known types of optical networks are Synchronous Optical Network (SONET) and Synchronous Digital Hierarchy (SDH). Sometimes such networks are referred to as broadband networks, namely, networks capable of supporting interactive multimedia applications, as mentioned in "SONET" (Second Edition) by Walter J. Goralski ("Goralski"), at pages 20–23. As SONET and SDH have similar frame overhead configurations, for purposes of clarity, the remainder of this specification will tend to be disclosed in more terms of a synchronous optical network using SDH than SONET. However, it will be appreciated by those of skill in the art, that this specification is equally applicable to other types of synchronous optical networks, including but not limited to SONET.

A key feature of SDH networks is synchronous operation. SDH networks are synchronized to a much higher degree than prior T-carrier trunking networks, so much so that such prior synchronized networks are referred to as part of a pleisochronous digital hierarchy (PDH).

In an SDH network, bits are sent from one node to another. These bits may be received or passed through such a node. Particularly, when bits are taken off one link and put on another link as for pass through bits such as occurs in an add/drop multiplexer (ADM) or a digital cross-connect system (DCS), the relationship between frames in a synchronous multiplexing scheme, such as SDH, becomes important. In other words, a bit that is dropped from one link must occupy the same bit position within a byte in a frame structure when added to another link. Thus, a receive clock on an input port of a node must agree within a significant amount of precision with a transmit clock on an output port of the node. An SDH network, having links where bits are terminated in endpoint devices at each end, has a distributed network-timing signal, such as from a stratum clock via global positioning satellite. This distributed network-timing signal is distributed to separate nodes on the network. However, jitter and other variations in clocking still occur.

Figure 1:
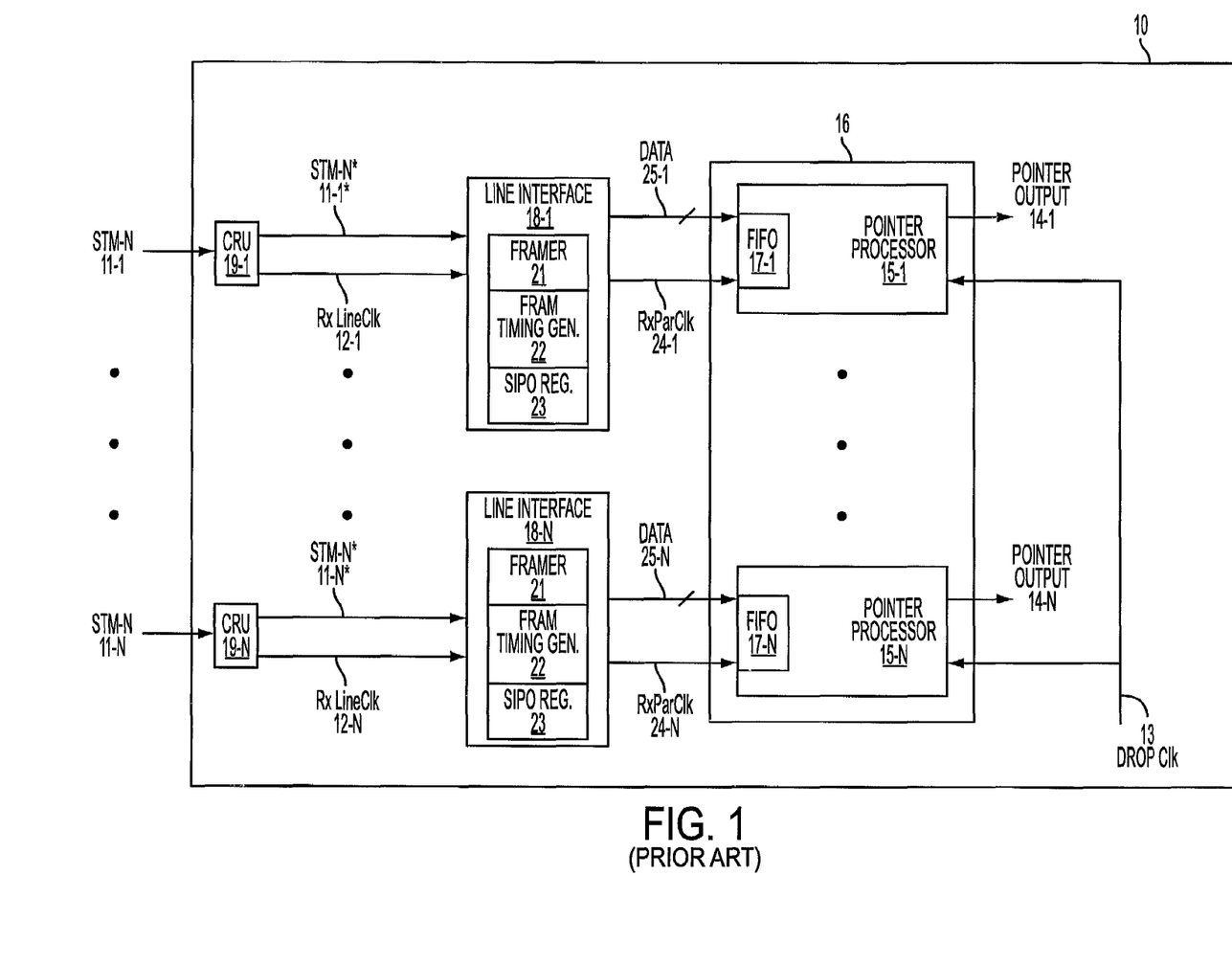
FIG. 1 is a block diagram of an asynchronous pointer processor interface in accordance with the prior art.

FIG. 1 is a block diagram of an exemplary portion of an embodiment of a portion of a receive side interface of a network node or network element 10 of the prior art. Synchronous Transport Module-level N (STM-N), for N equal to 1, 4, 16, 64, etc., signals 11-1 to 11-N are line inputs to respective clock recovery units (CRUs) 19-1 to 19-N. For SDH, data rate for an STM-N signal is N times 155.52 mega-bits per second (Mbps).

CRUs 19-1 to 19-N provide STM-N* signals 11-1* to 11-N* and receive (Rx) line clock (Clk) signals 12-1 to 12-N as outputs as illustratively shown to respective line interfaces 18-1 to 18-N. STM-N* signal 11-N* is equivalent to STM-N signal 11-N without clock pulses, and CRU 19-N provides a recovered Rx line clock 12-N.

Each line interface 18-1 to 18-N comprises a serial-in parallel-out (SIPO) register 23, a framer 21 and a frame timing generator 22. Line interfaces 18-1 to 18-N are used to convert STM-N* signals 11-1* to 11-N* serial input to parallel data output signals 25-1 to 25-N and to convert Rx line clock signals 12-1 to 12-N to Rx parallel clock signals (RxParClk) 24-1 to 24-N. Rx parallel clock signals 24-1 to 24-N are produced by dividing Rx line clock signals 12-1 to 12-N by a number corresponding to bit width of of parallel data output signals 25-1 through 25-N. For example, if data output signal 25-N is 8 bits wide, then Rx line clock signal is divided by eight to provide Rx parallel clock signal 24-N. An N-by-1 array 16 of pointer processors 15-1 to 15-N respectively receive signals 24-1 to 24-N and 25-1 to 25-N to provide respective pointer outputs 14-1 to 14-N. Each pointer processor 15-1 to 15-N has a first-in, first-out (FIFO) buffer 17-1 to 17-N.

Array 16 represents a multi-channel physical layer device, where physical layer indicates where line input, such as fiber optic line signals, meets integrated circuit. FIG. 1 is a channelized approach to dealing with such asynchronicity. In other words, each pointer output signal 14-1 to 14-N is provided separately or on a per channel basis. This is in contrast, for example, to receiving line input to a byte-interleaved multiplexer (MUX) and providing a single output with bytes interleaved from a plurality of line inputs.

Pointer processors 15-1 to 15-N, and more particularly buffers 17-1 to 17-N, are clocked-off of Rx side or drop clock signal 13, and thus operation of pointer processors 15-1 to 15-N, and more particularly buffers 17-1 to 17-N, is sychronized to drop clock signal 13. As one or more of Rx line clock signals 12-1 to 12-N may be out-of-phase, differ in frequency or differ in tolerance from drop clock signal 13, an asynchronicity may occur with respect to Rx parallel clock signals 24-1 to 24-N and drop clock signal 13. Thus, data from data output signals 25-1 to 25-N may not properly coincide with data corresponding pointer output signals 14-1 to 14-N as output from pointer processors 15-1 to 15-N, respectively, owing to misalignment with clock signal edges. Moreover, a separate pointer processor is used for each channel. Though FIG. 1 is illustratively shown for the receive side, a similiar asynchronicity problem heretofore exists on the transmit side (not shown) of network element 10.

Accordingly, it would be desirable to provide a method and apparatus that facilitates a reduction in the number of pointer processors.

SUMMARY OF THE INVENTION

The present invention provides method and apparatus for reducing misalignment of pointer output owing to misalignment of clock signal edges. More particularly, an aspect of the present invention comprises a first buffer and a second buffer. A frame structure is clocked to a line clock and provided to the first buffer. The frame structure is clocked to the line clock and provided to the second buffer. A first portion of the frame structure is stored in the first buffer. A second portion of the frame structure is stored in the second buffer. The first portion of the frame structure is clocked out from the first buffer synchronous to a system clock signal, and the second portion of the frame structure is clocked out from the second buffer synchronous to the system clock signal. The first portion of the frame structure is provided to a pointer processor buffer and is clocked out of the pointer processor buffer synchronous with the system clock signal.

Another aspect of the present invention is a network comprising a first network node, a second network node and a communication link for putting the first network node in communication with the second network node. The first network node is configured with a receive buffer and a transmit buffer. The receive buffer is configured to receive information clocked to a receive line clock signal, to store the information and to output the information synchronous to a drop clock signal. The transmit buffer is configured to receive the information clocked to an add clock signal, to store a portion of the information and to output the portion of the information clocked to a transmit reference clock signal.

Another aspect of the present invention is network node. A receive line interface is configured to receive at least one transmission. Buffers configured to decouple a line clock signal from data and to couple a system clock signal to the data. A pointer core is configured to receive output from the temporary storage device synchronous to the system clock signal. The pointer core having a buffer configured for synchronous operation with the system clock signal on an input and an output side.

Another aspect of the present invention is network node with a frame timing generator configured for synchronous operation off of a system clock signal. A temporary storage device is configured to receive output from the frame timing generator. The temporary storage device is configured to decouple the system clock signal from data and to couple a line clock signal to the data. The data is written to the temporary storage device synchronous to the system clock signal, and the data is provided from the temporary storage device synchronous to the line clock signal. A pointer core having a buffer. The buffer configured to receive the data output from the temporary storage device and to operate on both an input and an output side synchronous with the line clock signal.

Another aspect of the present invention is a temporary storage device. More particularly, a first buffer is configured to receive information provided in association with a line clock signal. The first buffer is configured to receive a first write enable signal for storing a first portion of the information. A second buffer is configured to receive the information provided in association with the line clock signal and to receive a second write enable signal for storing a second portion of the information different from the first portion of the information. A system clock signal is provided to the first buffer and the second buffer for synchronously clocking out the first portion and the second portion of the information. Accordingly, the first portion and the second portion of the information may be processed in a synchronous manner with respect to the system clock signal.

Another aspect of the present invention is another temporary storage device. More particularly, a buffer is configured to receive information provided in association with a system clock signal and to receive a write enable signal for storing a portion of the information. A frame timing generator is operable synchronous with the system clock signal, and combinatorial logic is configured to receive output from the frame timing generator and to provide the write enable signal. A line clock signal is provided to the buffer for synchronously clocking out the portion of the information.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

SONET and SDH are frame-based transmission architectures. Notably, frames may be concatenated. Each frame comprises an envelope portion and an overhead portion. With respect to the overhead portion, each frame transports Section Overhead (SOH) and Line Overhead (LOH) a frame. In SDH terminology SOH is termed regenerator section (RS) overhead (RSOH) and LOH is termed multiplex section (MS) overhead (MSOH). Another form of overhead in a frame is contained in an information payload area. This overhead is called Path Overhead (POH). POH is processed at path terminating equipment as it travels as part of a Synchronous Payload Envelope (SPE). Thus, SPE comprises both user data and overhead, namely, POH. Section and line overhead is terminated at section and line terminating equipment. Again, though this description is based on SDH for purposes of clarity, the present invention may be implement with synchronous networks, including but not limited to PDH, SONET and other networks having one or more asynchronous-to-synchronous or synchronousto-asynchronous boundaries or interfaces. Moreover, the present invention may be used with cell-based or packet-based architectures.

Figure 2A:
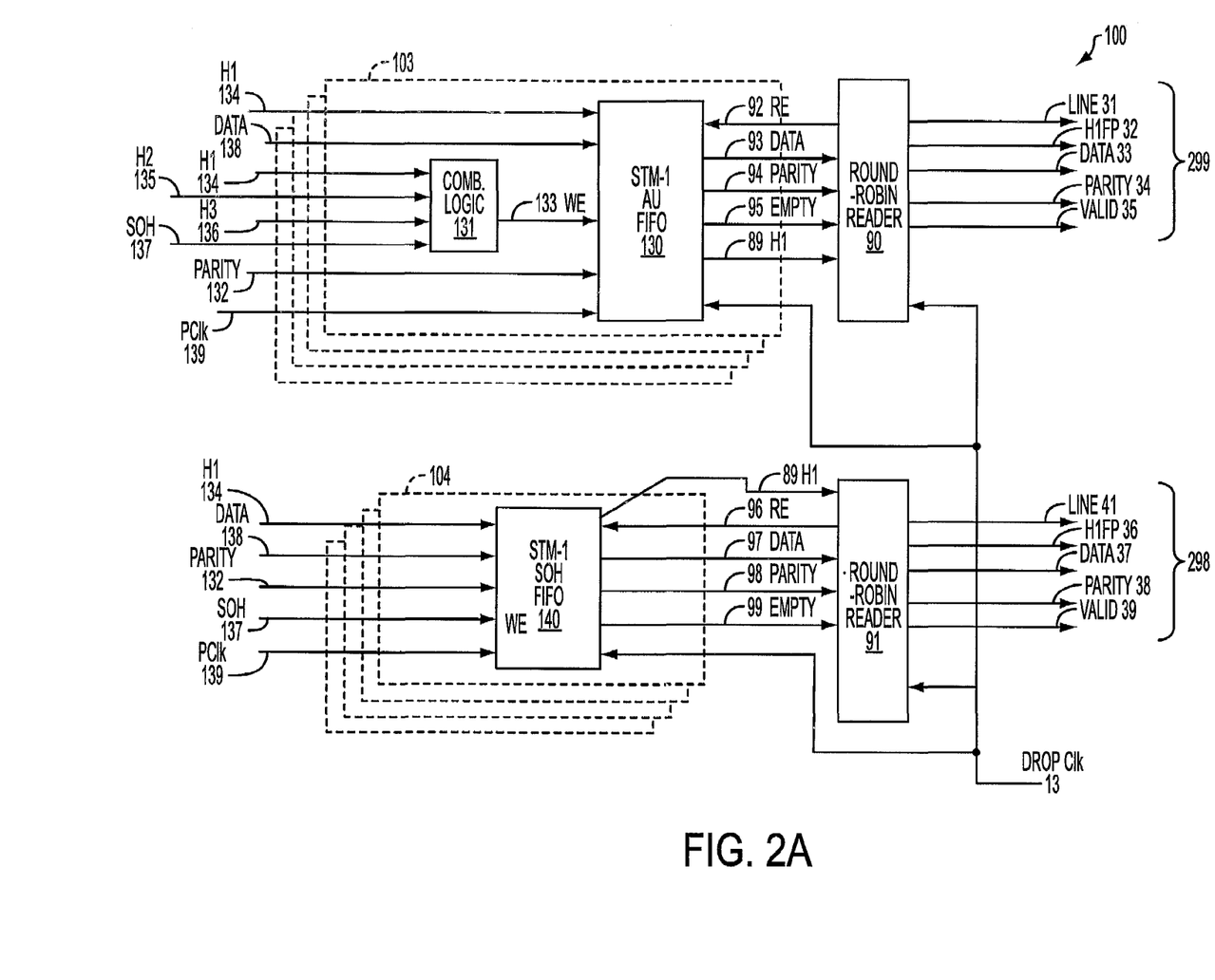
FIG. 2A is a block diagram depicting an exemplary portion of an embodiment of a receive side clock-decoupling buffer in accordance with an aspect of the present invention.

FIG. 2A is a block diagram depicting an exemplary portion of an embodiment of a clock-decoupling buffer ("clock-decoupling buffer" or CDB) 100 in accordance with an aspect of the present invention. The particular implementation shown is for STM-1; however, the present invention may be used with STM-N, for N=1, 4, 16, 64, and so forth. Accordingly, it will be apparent to one of skill in the art that one or more multiplexers may be used with a plurality of N clock-decoupling buffers for an STM-N implementation. For example, four STM-1s may be used to provide STM-4. With respect to SONET, three synchronous transport signal (STS) for level one (STS-1s) may be concatenated (STS-3c) to provide an STM-1.

FIG. 2A depicts a receive side or Rx data path implementation. Buffer 100 comprises one or more input stage buffers 103 and 104 and one or more respectively coupled readers 90 and 91. For purposes of clarity of explanation, the term buffer has been used to refer generally to a temporary storage element or device. Furthermore, examples of particular buffers are described herein for purposes of clarity of explanation; however, it will be apparent to one of skill in the art that other devices such as memory, registers and the like may be substituted without departing from the scope of the present invention. Readers 90 and 91 may be round-robin readers. Each buffer of input stage buffers 103 and 104 on an output side ("drop side") and each reader 90 and 91 is clocked by drop clock signal 13. Readers 90 and 91 operation may be considered time division multiplexing. Readers 90 and 91 may be configured to support more than one input stage buffer 103 and 104. For example, readers 90 and 91 may be configured to support four input stage buffers 103 and 104, respectively, in which embodiment each reader 90 and 91 is a four set-to-one set multiplexer for sets of signals.

Each input stage buffer 103 comprises a combinatorial or OR logic 131 and a First-In First-Out (FIFO) buffer 130, which in this embodiment is a STM-1 Administrative Unit (AU) FIFO buffer. Three additional input stage buffers 103 may be implemented, as described below. OR logic 131 is configured to receive H1 signal 134, H2 signal 135, H3 signal 136 and SOH signal 137. SOH signal 137 is not SOH in SONET terms, but is section overhead such as RS or MS section overhead. In SONET terms, signal 137 would be referred to as TOH signal 137 for transport overhead.

H1, H2 and H3 refer to well-known SDH or SONET pointers forming a portion MS or LOH, which are sometimes referred to in terms of overhead bytes as H1-pointer, H2-pointer and H3-pointer bytes. Bytes may be "dropped" in an embodiment described herein with respect to buffers 130 and 140. For example, A1 may be "dropped," or A1, A2 and J0 may be "dropped," or the first three rows after H1, H2 and H3 may be dropped, or some other RS or MS overhead or combinations thereof. By "dropped", it is meant one or more bytes are not written into a buffer of an input stage. The number of bytes dropped or replaced has an effect on a processing frequency difference or margin as described in more detail below.

As mentioned above, an STM-1 frame in SDH is like an STS-3c frame in SONET, so in an STM-1 frame there are three sets of H1, H2 and H3 pointers. Where SONET tends to treat H1, H2 and H3 pointer bytes as just a LOH function, SDH treats such pointer fields as an AU overhead row. Thus, an AU frame comprises H1, H2 and H3 pointers and an SPE. Many well-known details regarding SDH and SONET frames have been omitted for purposes of clarity. Sufficed to state that H1- and H2-pointer bytes point to a start of an SPE, and H3-pointer bytes are for pointer action to adjust the value of H1 and H2 pointers when one or more bytes are to be sent in a frame to accomodate such SPE.

With continuing reference to FIG. 2A, OR logic 131 produces write enable (WE) signal 133 when H1 signal 134, H2 signal 135 or H3 signal 136 is active or when SOH signal 137 is not active. Thus, OR logic 131 may be though of as H1 OR H2 OR H3 OR NOT SOH. WE signal 133 puts buffer 130 in a condition to receive information for temporary storage. Thus, when H1 signal 134, H2 signal 135 or H3 signal 136 is active or when SOH signal 137 is not active, buffer 130 is enabled to have information written to it. Accordingly, buffer 130 is enabled to have H1, H2, H3 and SPE information written into it. However, other overhead bytes may be used as mentioned above.

Buffer 130 is configured in part to receive WE signal 133, H1 signal 134, data signal 138, parity signal 132 and parallel clock (PClk) signal 139. Data signal 138 may be eight bits, data [7:0] signal 138, wide for one byte of information. It will be appreciated by those of skill in the art that some signals in the Figures use a single arrow for purposes of clarity though a single or multiple signal lines would be used for an actual implementation. Accordingly, arrows are not to indicate actual lines or traces, but are merely illustrative of coupling and direction of signals.

Data signal 138 is provided in parallel from a SIPO register, illustratively shown in FIG. 1. Parity signal 132 is not bit interleaved parity (BIP) overhead; rather, it is a parity, such as odd or even, for data signal 138. Parity signal 132 may be used to determine if an integrated circuit is functioning properly. Parallel clock signal 139 is an Rx parallel line clock signal, such as Rx parallel clock signals 24-1 to 24-N of FIG. 1, divided by data bit width, for example eight bits.

H1 signal 134 is provided to buffer 130 to tag, point out or otherwise flag a byte passing through buffer 130. By tagging a byte that will pass through buffer 130, a location or position in a frame structure can be determined for processing on drop clock signal 13. H1 signal 134 is used to tag a portion, more particularly a byte, of data signal 138; however, bytes other than H1 may be for tagging. Moreover, any MS or RS overhead byte that passes through buffer 130 may be used for tagging a byte in a data signal to determine location or position of a frame structure.

Buffer 130 provides as output H1 signal 88, data signal 93, parity signal 94 and empty signal 95 to reader 90. Data and parity signals 93 and 94 are buffered versions of portions of data and parity signals 138 and 132, respectively, owing to WE signal 133 limiting what is written into buffer 130. H1 signal 88 is a buffered version of H1 signal 134. H1, data and parity signals 88, 93 and 94 are delayed by buffering and then clocked out off of drop clock signal 13.

Empty signal 95 indicates state of buffer 130. Empty signal 95 may be a four-bit signal [1:4] for example to accomodate four input stages 103, as outputs of all four input stages 103 may be provided to reader 90. Thus, empty signal 95 provides an indication of which buffer is in which state. While one reader may be used for each input stage buffer 103, it is more efficient to have more than one input stage buffer 103 to a reader. Empty signal 95 indicates if an output of a stack in a buffer 130 is empty or has data. If it is empty, valid signal 35 indicates an invalid state for that byte; however, if such a stack has data, valid signal 35 indicates a valid state for that byte.

Read enable (RE) signal 92 is provided from reader 90 to buffer 130 to cause buffer 130 to read out buffered information in a form of H1 signal 88, data signal 93 and parity signal 94. RE signal 92 may be a four-bit signal [1:4] for example to indicate which buffer 130 of an input stage buffer 103 is to be enabled for reading. RE signal 92 is provided in response to empty signal 95 indicating that information is available to be read out of buffer 130.

From reader 90, line# signal 31, H1 frame pulse (H1FP) signal 32, data signal 33, parity signal 34 and valid signal 35 are provided. Line# signal 31 is provided in response to having multiple input stages 103 and having to provide an indication of which buffer information was obtained. Line# signal 31 may be a two bit wide signal or line#[1:0] signal 31 to indicate four possible buffers. Line# signal 31 is clocked from reader 90 off of drop clock signal 13. Data signal 33 and parity signal 34 are versions of data signal 93 and parity signal 94, respectively, and are clocked from reader 90 off of drop clock signal 13. Valid signal 35 is provide in response to empty signal 95, as described above. H1FP signal 32 is provided in response to H1 signal 88. H1FP signal 32 is for providing a frame pulse for tagging an HI overhead byte. Valid signal 35 and H1FP signal 32 are clocked out of reader 90 via drop clock signal 13.

Each input stage buffer 104 comprises a FIFO buffer 140, which in this embodiment is an STM-1 SOH FIFO buffer. As mentioned above, a reader 91 may be used for each input stage buffer 104 or may be used for a plurality of input stage buffers. In this example, four input stage buffers 104 are illustratively shown. Buffer 140 is configured to receive H1 signal 134, data signal 138, parity signal 132, SOH signal 137 and parallel clock signal 139. These signals were previously described with respect to input stage buffer 103.

SOH signal 137 is used as a WE signal for buffer 140. Accordingly, it shoud be appreciated that when SOH signal 137 is not active, buffer 140 is not enabled to have information written to it, and in contrast when SOH signal 137 is active, buffer 140 is enabled to have information written to it. Accordingly, SOH from data signal 138 is written into buffer 120, as described in more detail with reference to FIG. 2B.

Buffer 140 provides H1 signal 89, data signal 97, parity signal 98 and empty signal 99 to reader 91. H1 signal 89, data signal 97, parity signal 98 and empty signal 99 are similar to H1 signal 89, data signal 93, parity signal 94 and empty signal 95, respectively. RE signal 96 is similar to RE signal 92. Data signal 97 and parity signal 98 are buffered versions of data signal 138 and parity signal 132, respectively, limited or filtered by use of SOH signal 137 as a write enable signal for buffer 140. In other words, RS or MS is written to buffer 140, for subsequent output as data signal 97 having a parity associated with parity signal 98, when SOH signal 137 is active. Information, such as contained in an SPE, is not written to buffer 140 when SOH signal 137 is not active. H1 signal 89, data signal 97 and parity signal 98 are clocked out of buffer 140 off of drop clock signal 13.

From reader 91, line# signal 41, H1FP signal 36, data signal 37, parity signal 38 and valid signal 39 are provided. Line# signal 41, H1FP signal 36, data signal 37, parity signal 38 and valid signal 39 are similar to line# signal 31, H1FP signal 32, data signal 33, parity signal 34 and valid signal 35, respectively. A difference in these two groups of signals is what information is buffered for output, as described in more detail in FIG. 2B.

Drop clock signal 13, or more generally a synchronous system signal, is provided in part to buffers 130 and 140. If D is a difference in frequency between a line clock signal, such as parallel clock signal 139, and a system clock signal, such as drop clock signal 13. For a system clock signal faster in frequency than a line clock signal, D is greater than zero. Accordingly, in the embodiment illustratively shown, buffer 140 will not overflow if D is greater than zero because information is clocked out faster than it is received. When synchronously clocking out information on a system clock signal, such as drop clock signal 13, buffered information is decoupled from a line clock signal, such as parallel clock signal 139.

However, when D is less than zero, or possibly when D equals zero, buffers, such as buffer 140, may overflow. To avoid an overflow condition, an incoming SDH frame is passed as an AU-frame into an asynchronous input side of a buffer, such as buffer 130, and RS and at least a portion of multiplex section MS overhead information into an asynchronous input side of another buffer, such as buffer 140. This compensates for a difference in frequency between a line clock signal, such as parallel clock signal 139, and a system clock signal, such as drop clock signal 13, to avoid data loss owing to overflow. These buffers are synchronously operated on an output side off of a system clock signal. For purposes of clarity, signal outputs from readers 90 and 91 have been identified by group as outputs 299 and 298, respectively.

Figure 2B:
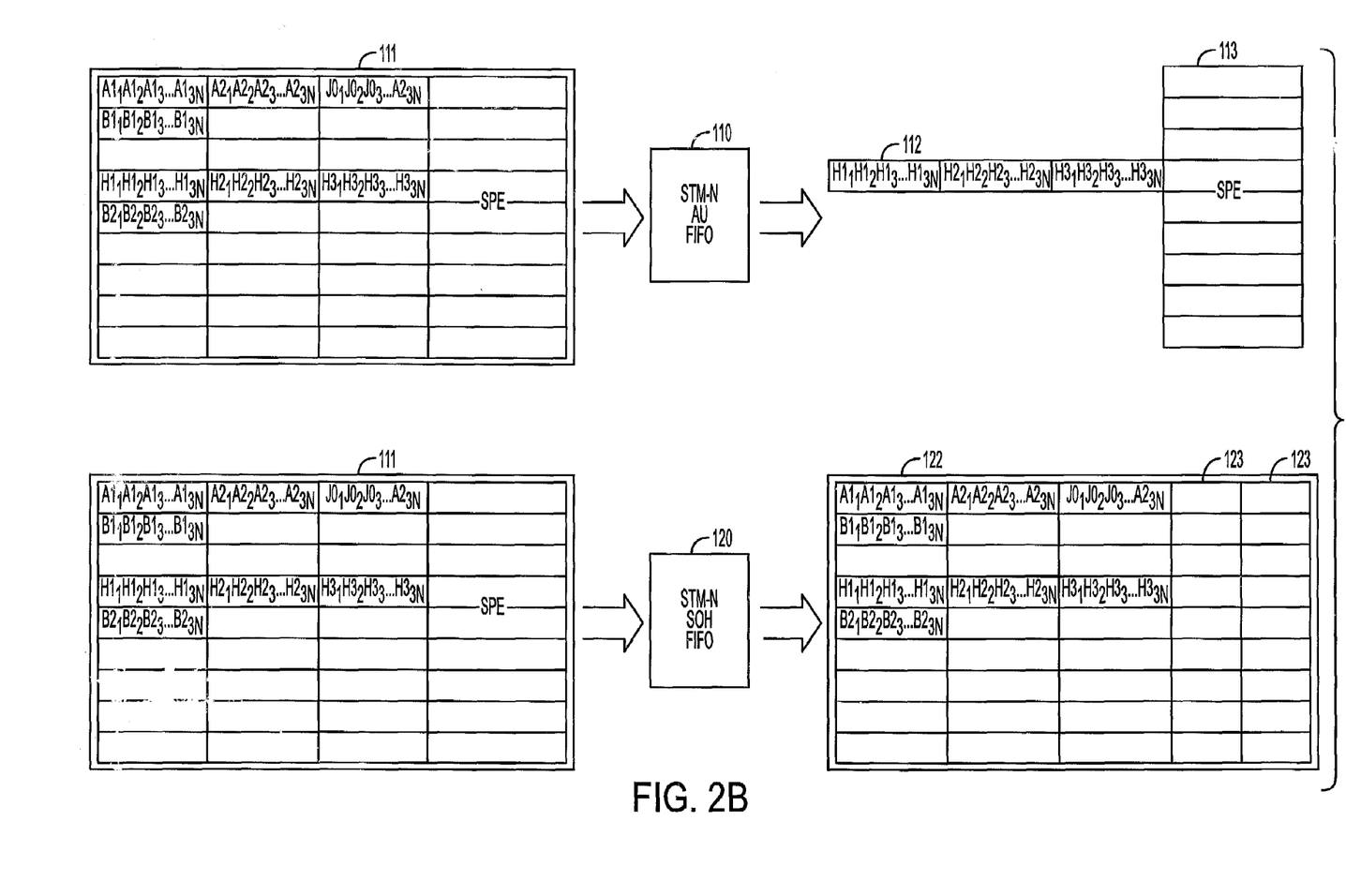
FIG. 2B is a data flow diagram depicting an exemplary portion of an embodiment of frame structure flow through a clock-decoupling and -coupling buffer in accordance with an aspect of the present invention.

Referring to FIG. 2B, there is shown a block diagram of an exemplary portion of frame structure through STM-N buffers in accordance with an aspect of the present invention. STM-N buffers 110 and 120 are an STM-N AU FIFO and an STM-N SOH FIFO, respectively, and may be buffers 130 and 140 of FIG. 2A, respectively. A frame structure 111 is provided to each buffer 110 and 120. Each frame structure 111 comprises a "SOH" portion 122 and an SPE portion 113. Each "SOH" portion 122 comprises at least any portion of RS or MS overhead, for example A1, A2, J0, B1, B2, H1, H2 and H3 overhead.

After inputting frame structure 111 into buffer 110, information from such frame structure 111 is synchronously clocked out of buffer 110 using a system clock signal, such as a drop clock signal 13 shown in FIG. 2A. Output of buffer 110 is an output frame structure comprising SPE portion 113 and an H1-H2-H3 overhead information portion 112, which is a portion of "SOH" portion 122. After inputting frame structure into buffer 120, information from such frame structure 111 is synchronously clocked out of buffer 120 using a system clock signal, such as drop clock signal 13 shown in FIG. 2A. Output of buffer 120 is an output frame structure comprising "SOH" portion 122. By "SOH" portion, it is meant a portion of RS or MS overhead or a combination thereof, or in SONET terms a portion of transport overhead (TOH).

Optionally, calculated B1 and B2 BIP overhead may be passed through CDB 100 as part of data signals, or more particularly data buffered in an SOH FIFO, to put them into the drop clock timing domain. Calculated B1 and B2 BIP for example may be passed through a CDB using appropriate available columns 123. Available columns 123 may be used for passing other information to put it into a system clock timing domain.

Referring again to FIG. 2A, it should be appreciated that buffer 100 facilitates design of synchronous digital circuitry, especially for an Rx pointer FIFO of an Rx pointer processor or Rx pointer core. Buffer 100 decouples received information from a line clock and couples or synchronizes such received information to a system clock. Because circuitry to the right of input buffer stages 103 and 104 is synchronous, scaling is facilitated by having subsequent processing of data having clock edges aligned to a system clock signal, as opposed to a misalignment between a line clock signal and a system clock signal. With respect to scaling, output input buffer stages 103 and 104 may be multiplexed to provide STM-N level configurations for N greater than one.

Figure 3A:
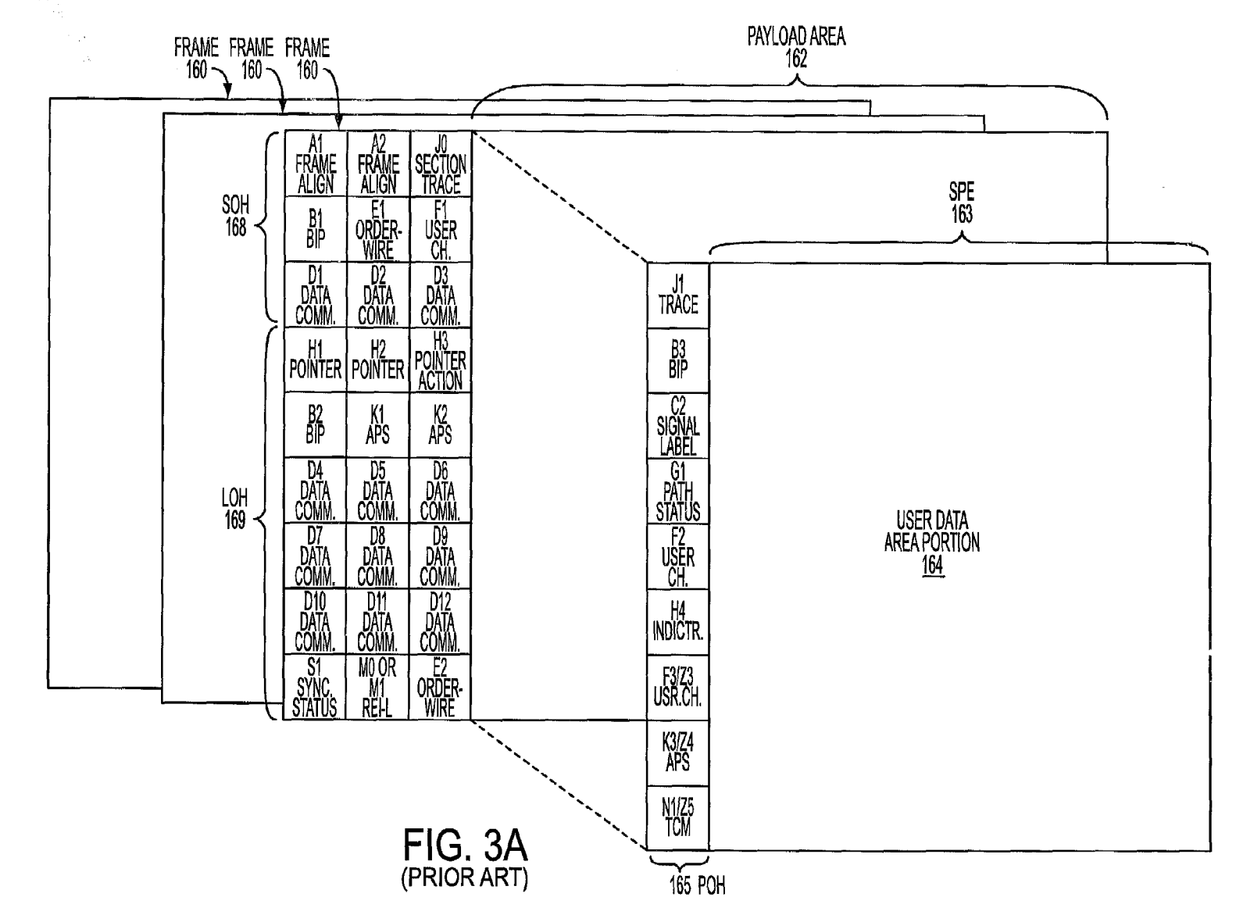
FIG. 3A is block diagram depicting an exemplary portion of SONET frames of the prior art.
Figure 3B:
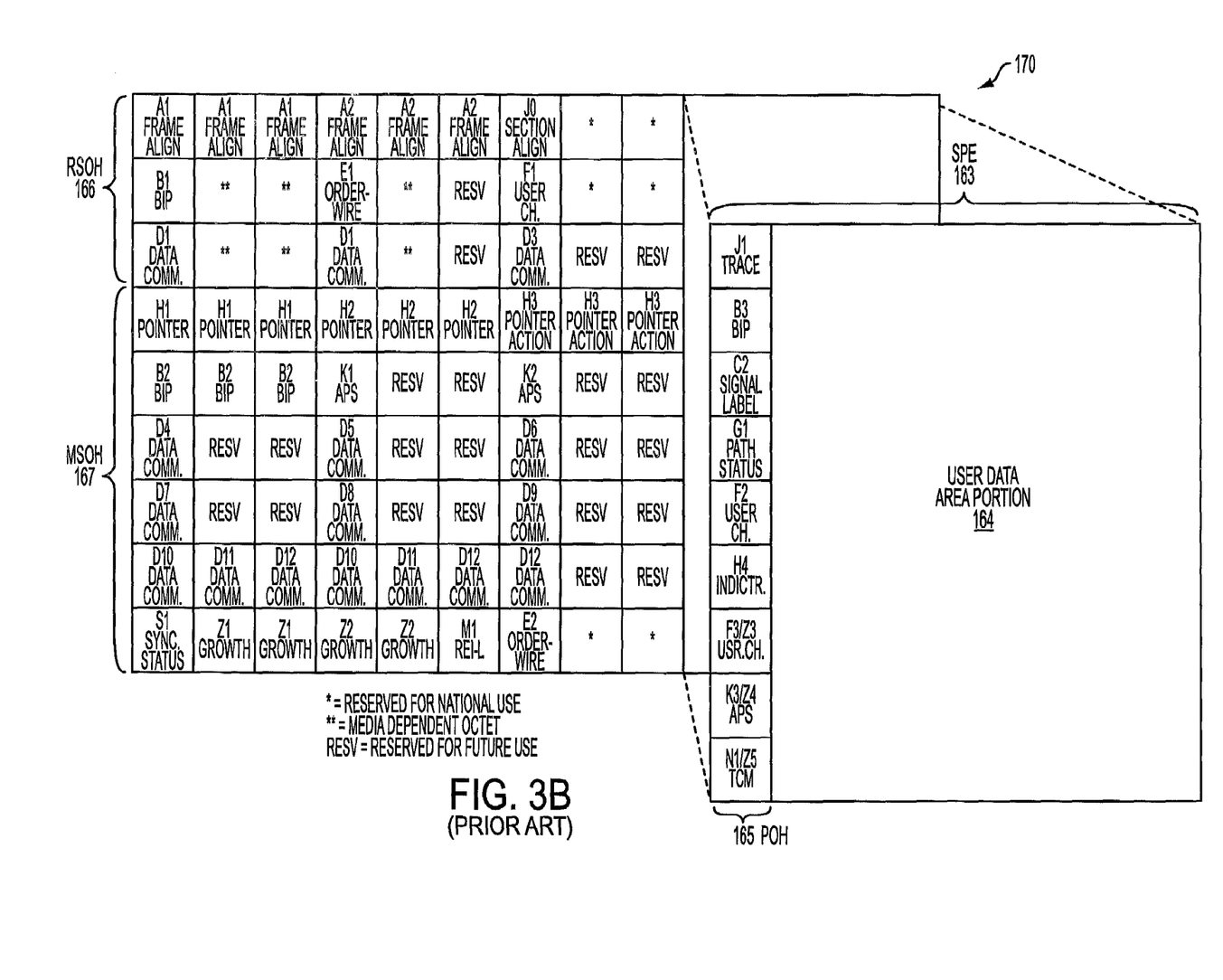
FIG. 3B is block diagram depicting an exemplary portion of an SDH frame of the prior art.

Referring to FIGS. 3A and 3B, there are shown block diagrams depicting respective exemplary portions of a SONET frame 160 and an SDH frame 170 each of the prior art. As is known, an STM-1 frame may be equated to three STS-1 frames concatenated (STS-3c), each of which forms a matrix of 9 rows by 90 columns wherein each cell within such a matrix is one byte. As mentioned above, frame 160 comprises POH 165, SOH 168, and LOH 169. As mentioned above, SOH 168 is sometimes referred to as a RSOH in SDH terminology, and LOH 169 is sometimes referred to as a MSOH in SDH terminology. POH 165 is located in payload area 162 and forms a portion of SPE 163. SPE 163 comprises POH 165 and user data 164. Notably, AU3 in an SDH frame, unlike a SONET frame, does not have independent H1 and H2 pointers.

SDH frame 170 comprises RSOH 166 and MSOH 167. As is evident from a comparison of FIGS. 3A and 3B, SDH frame 170 comprise many of the same overhead byte fields as SONET frame 160.

Frames 160 and 170 comprise well-known overhead byte fields. Notably, J0 is defined only in the first occurence from a device or node, as all frames associated with a concatenation must come from the same device; in other frames in an STM-N, J0 is used for growth (Z0). Moreover, it should be understood that byte fields may be undefined, as is well known. Moreover, byte fields may be used for growth, namely, S1 and M0 or M1, instead of as indicated, as is well known. Because frames 160 and 170 are well known, other details regarding them have been omitted for purposes of clarity.

Figure 4:
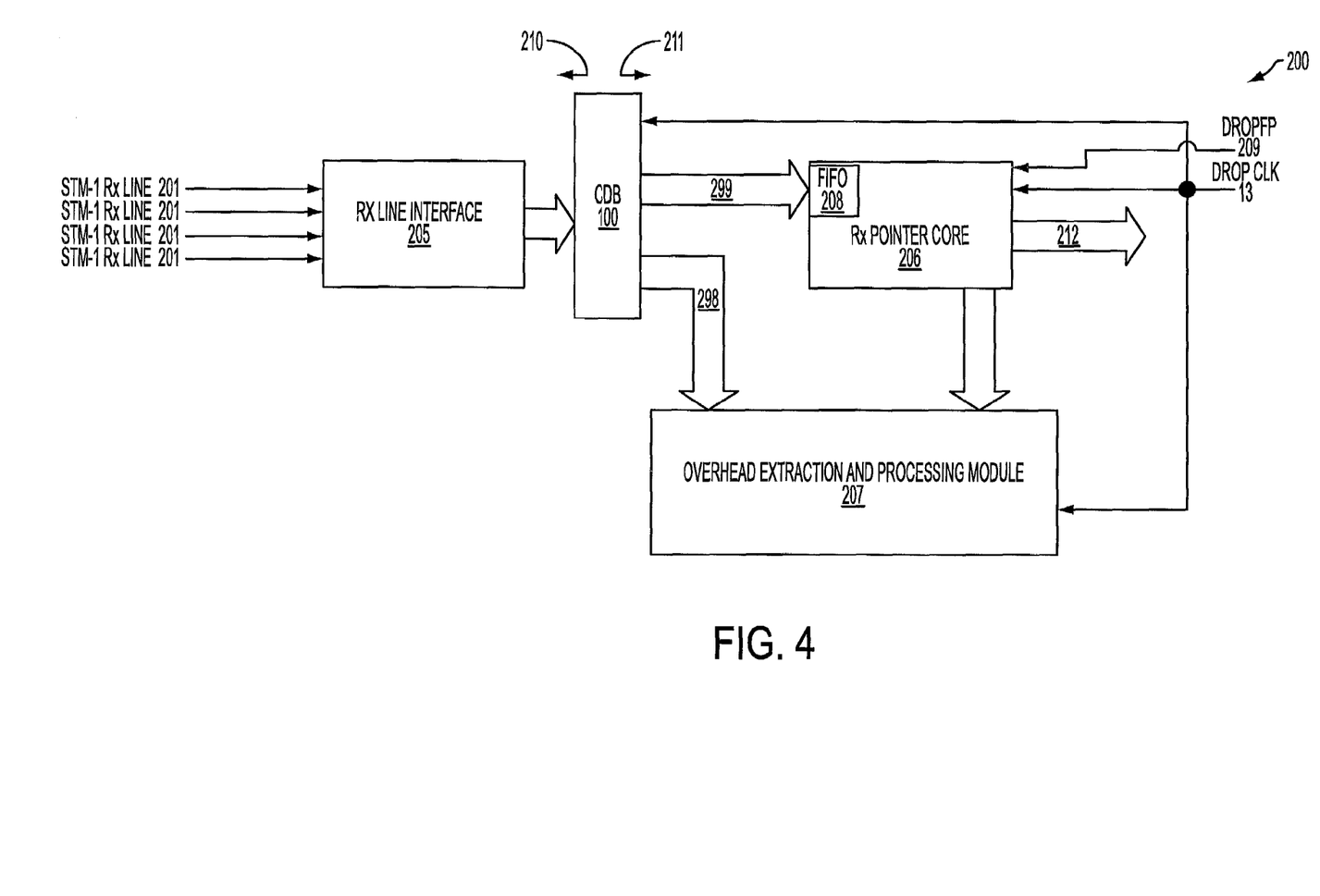
FIG. 4 is a block diagram depicting an exemplary portion of an embodiment of a receive side of a synchronous transfer system in accordance with an aspect of the present invention.

Referring to FIG. 4, there is shown a block diagram depicting an exemplary portion of an embodiment of a receive side of a synchronous network node 200 in accordance with an aspect of the present invention. FIG. 4 is for an STM-4 embodiment though other values for N may be used in accordance with one or more aspects of the present invention. Line clock timing domain is to the left of CDB 100, as indicated by arrow 210, and drop clock timing domain is to the right of CDB 100, as indicated by arrow 211. A plurality of STM-1 Rx line signals 201 are provided to Rx line interface 205, which provides an output for input to CDB 100. Inputs to CDB 100 were previously described with respect to FIG. 2A; however, rather than one STM-1, four STM-1s are inputted.

Outputs of CDB 100, previously described with reference to FIG. 2A, are provided to Rx pointer processor or Rx pointer core 206 and overhead extraction-processing module or overhead extractor-processor 207. A module 207 is described in more detail in a co-pending U.S. patent application entitled "Method and Apparatus for Frame-Based Protocol Processing" to Oreste Basil Varelas and Barry Kazuto Tsuji, named inventors herein, application Ser. No. 09/862,141, filed May 21, 2001.

CDB 100, core 206 and module 207 are clocked of system drop clock signal 13. Core 206 may be operated in part off of optional drop frame pulse (FP) signal 209 to mark a starting point of a frame. Pointer core 206 comprise FIFO buffer 208. FIFO buffer 208 is synchronized to drop clock signal 13 on an input side and an output side. In other words, a write side and a read side of FIFO buffer 208 is synchronized to output from CDB 100 off of drop clock signal 13. It should be appreciated that pointer core 206 FIFO buffer 208 is synchronize on both write and read sides to drop clock signal 13, and thus complexity for solving misalignment of clock edges in pointer processing as compared with the prior art of FIG. 1 is reduced.

Outputs of Rx pointer core 206 may be for example to a telecommunication bus drop side equipment, a facility loopback or an alarm generator, as indicated by arrow 212. Other outputs of Rx pointer core 206 are to module 207. Again, because both input and output sides of FIFO buffer 208 are synchronized with a system clock signal, for example a drop or an add clock signal, complexity of operation of Rx pointer processor 206 is reduced as compared with the prior art of FIG. 1.

Figure 5:
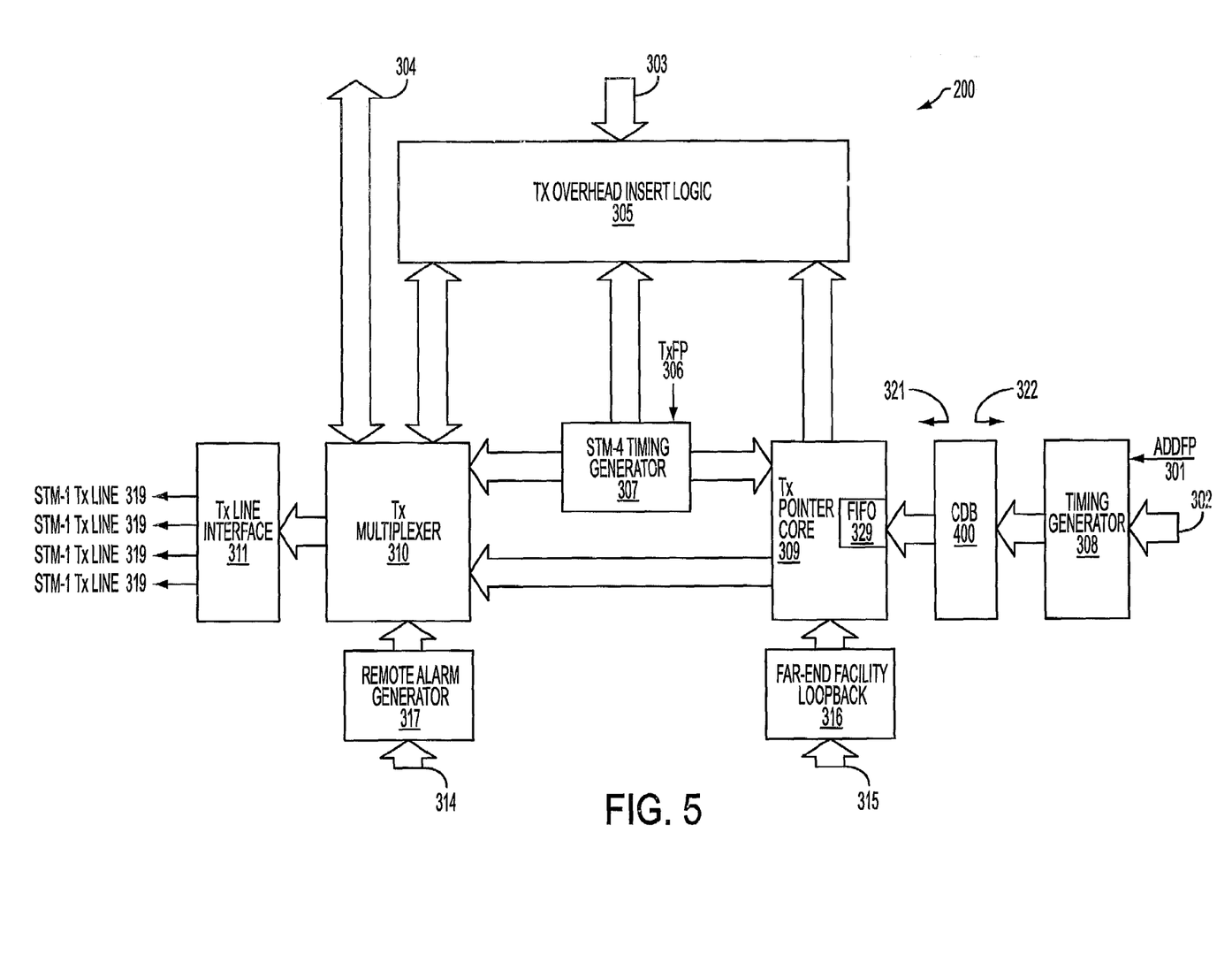
FIG. 5 is a block diagram depicting an exemplary portion of an embodiment of a transmit side of a synchronous transfer system in accordance with an aspect of the present invention.

In FIG. 5, there is shown a block diagram depicting an exemplary portion of an embodiment of a transmit (Tx) side of synchronous network node 200 in accordance with an aspect of the present invention. Input is received, for example from a telecommunications bus Tx or add side, as indicated by arrow 302 to timing generator 308. Output of timing generator is provided to CDB 400 (shown in more detail in FIG. 6A). To the right of CDB 400 is an add or system clock timing domain, as indicated by arrow 322, and to the left of CDB 400 is a line clock timing domain, as indicated by arrow 321.

Output of CDB 400 is synchronized to a transmit reference clock signal (TxRefClk) 126 (shown in FIG. 6) and is provided to Tx pointer core 309. Tx pointer core or Tx pointer processor 309 is operated off of Tx frame pulse (TxFP) signal 306, which is optional. Accordingly, because signals 306 and 126 are synchronized to one another, introduction of CDB 400 facilitates synchronous operation of Tx pointer processor 309 FIFO 329. In other words, by decoupling a system clock signal to couple data to a line clock signal, clock edges on write and read sides of FIFO 329 are synchronized.

Optionally, far-end facility loopback 316 and remote alarm generator 317 may be coupled to receive output from Rx pointer core 206 (shown in FIG. 4) as indicated by arrows 315 and 314, respectively. Output of far-end facility loopback 316 may be provided to Tx pointer core 309, and output of remote alarm generator 317 may be provided to Tx multiplexer 310. Output of Tx pointer core 309 is provided to Tx inserter FIFO (buffer) 305 and Tx multiplexer 310. Timing generator 307, which for this embodiment is an STM-4 timing generator, is configured to receive an optional Tx frame pulse (TxFP) signal 306. Output of timing generator 307 is provided to Tx overhead inserter logic 305, Tx pointer core 309 and Tx multiplexer 310. Tx overhead inserter logic 305 may comprise a FIFO configured to insert overhead.

Tx overhead inserter logic 305 receives input from a Tx overhead interface, as indicated by arrow 303, and from Tx multiplexer 310, and Tx inserter FIFO 305 provides output to Tx multiplexer 310. Tx multiplexer 310 receives input from Tx inserter FIFO 305 and from a Tx OPL interface, as indicated by arrow 304, and optionally receives input from remote alarm generator 317. A Tx OPL interface is described in more detail in a co-pending U.S. patent application entitled "Method and Apparatus for Frame-Based Protocol Processing" to Oreste Basil Varelas and Barry Kazuto Tsuji, named inventors herein, application Ser. No. 09/862,141, filed May 21, 2001. Tx multiplexer 310 provides output to such Tx OPL interface and to Tx line interface 311. In this embodiment, Tx line interface 311 provides four STM-1 Tx line outputs 319 for an STM-4 configuration; however, other values of N may be used in accordance with one or more aspects of the present invention.

Figure 6:
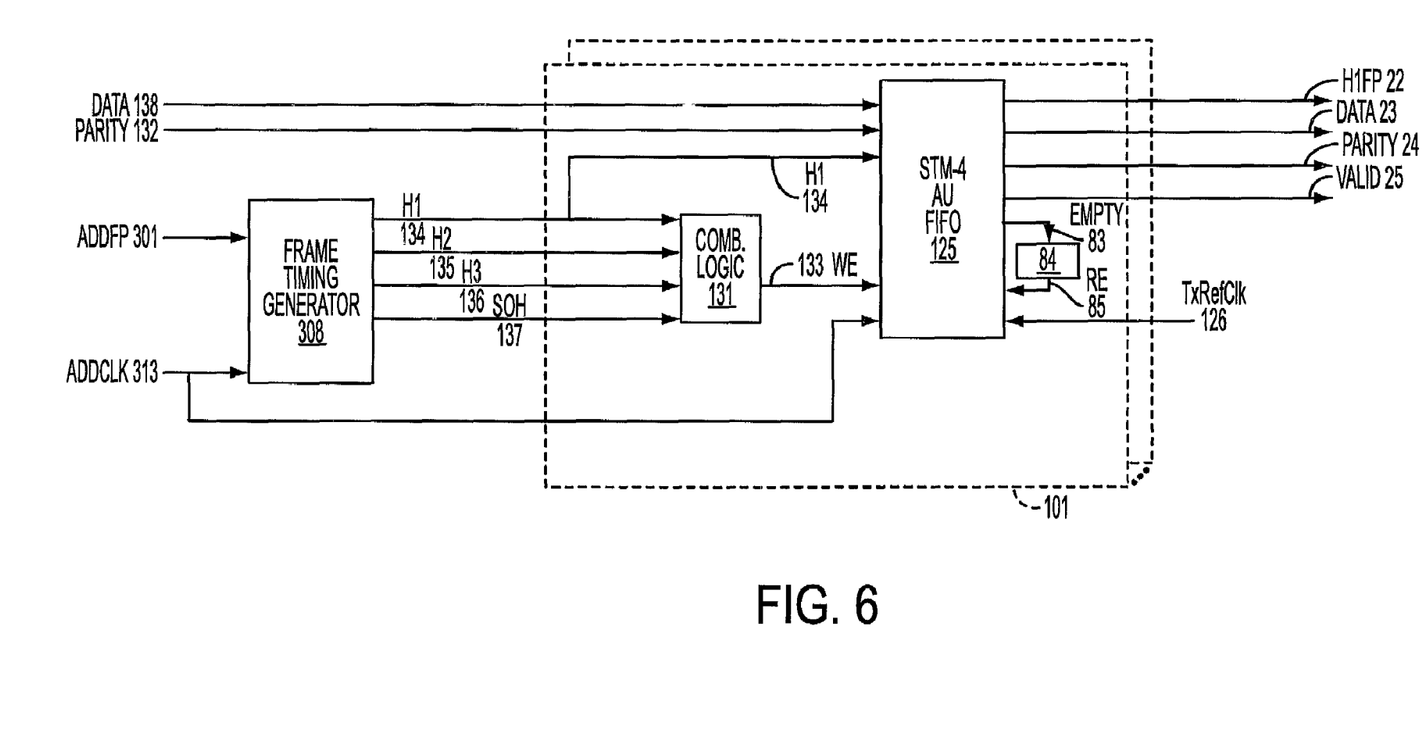
FIG. 6 is a block diagram depicting an exemplary portion of an embodiment of a transmit side clock-decoupling buffer in accordance with an aspect of the present invention.

FIG. 6 is a schematic diagram depicting an exemplary portion of an embodiment of a CDB 400 for an add or a transmit side in accordance with an aspect of the present invention. Add clock signal (ADDCLK) 313 is provided to frame timing generator 308 and STM-4 AU FIFO buffer 125 of an output buffer stage 101. A plurality of output stage buffers may be used for higher orders of N. STM-4 was used to correspond with FIG. 5; however, STM-N for N equal to 1, 4, 16, 64, and so forth may be used.

Add frame pulse (ADDFP) signal 301, which is synchronous with add clock signal 313, is provided to frame timing generator 308. Generator 308 provides H1 signal 134, H2 signal 135, H3 signal 136 and SOH signal 137 combinatorial logic 131, as described above, from ADDFP signal 301. Combinatorial logic 131 generates WE signal 133, as described above, which WE signal 133 is provided to buffer 125. Add side versions of data signal 138, parity signal 132 and H1 signal 134 are provided buffer 125. These signals are as described above with respect to FIG. 2A, except application here is on the add side. Buffer 125 provides H1FP signal 22, data signal 23, parity signal 24 and valid signal 25, which signals were described above with respect to H1FP signal 32, data signal 33, parity signal 34 and valid signal 35. However, H1FP signal 22, data signal 23, parity signal 24 and valid signal 25 are clocked off of transmit reference clock signal 126. Thus, buffer 125 decouples signals from synchronous operation with add clock signal 313 and couples signals to operate off of a line clock signal such as transmit reference clock signal 126. Buffer 125 provides empty signal 83, similar to previously described empty signal 95, to one or more logic elements or gates configured as a logical NOT operation to provide RE signal 85. RE signal 85 enables information to be read from buffer 125.

Referring again to FIG. 2B and with continuing reference to FIG. 6, STM-N buffer 110 may be thought of as buffer 125 of FIG. 6. A frame structure 111 is provided to buffer 125. Frame structure 111 comprises a SOH portion 122 and an SPE portion 113. After synchronously inputting frame structure 111 into buffer 125 off of add clock signal 313, information from such frame structure 111 is clocked out of buffer 125 using transmit reference clock signal 126. Output of buffer 125 is an output frame structure comprising SPE portion 113 and an H1-H2-H3 overhead portion 112, which is a portion of SOH (TOH in SONET terms) portion 122. Additionally, other over head bytes may be passed through CDB 400 using available columns.

Figure 7:
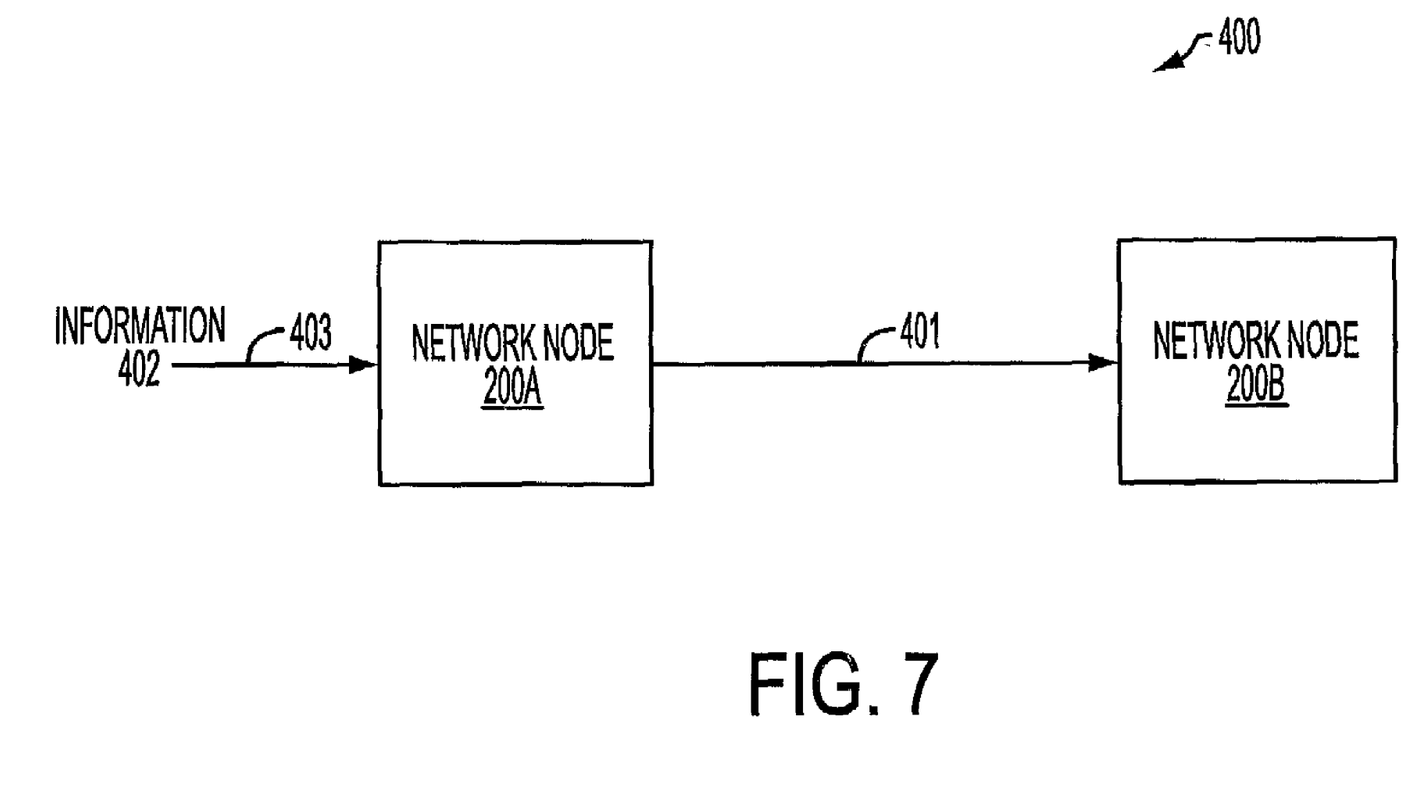
FIG. 7 is a block diagram depicting an exemplary portion of a network in accordance with an aspect of the present invention.

Referring to FIG. 7, there is shown a block diagram of a portion of a network 400 in accordance with an aspect of the present invention. Network 400 comprises two network nodes 200 connected or otherwise in communication with one another via a communication link 401. Communication link 401 may be a fiber optic connection. Transmitted information clocked to a line clock, namely information 402, is received by node 200A via communication link 403. Information 200A is "dropped" by node 200A into a synchronous domain with a system clock of node 200A. Information 200A is later "added" back for transmission to node 200B via link 401. Information 200A is added back such that each bit dropped from link 403 occupies the same bit position in a byte of a frame structure when added to link 401. This is facilitated by CDBs 100 and 400 in network node 200A, as described elsewhere herein, having pointer processing where clock edges are aligned using synchronous clocks on both input and output sides of pointer processor buffers. This use of synchronous clocks is facilitated by introduction of a clock-decoupling buffer in a data input path ahead of each respective pointer processor buffer.

Advantageously, by using buffers in advance of incoming data, rather than having a separate pointer processor and FIFO for each channel, a plurality of channels may be multiplexed for an output provided to a pointer processor. Thus, total number of pointer processors is reduced; however, this pointer processor will have to operate at a frequency sufficient to handle the multiplexed output.

It should be understood that a difference in line and system clock frequencies is accomodated. For example, with respect to a receive side where system clock frequency is less than line clock frequency, an STM-N frame, 9 by 3 by N by 90 or 2430N bytes, each byte dropped results in a 1/(2430N) tolerance in frequency difference between line andy system clocks. Accordingly, the reverse statement is equally applicable on a transmit side. As mentioned above, an overflow condition may be avoided by dropping one or more bytes to accomodate such a frequency difference.

Accordingly, it should be appreciated that an SDH, SONET or PDH clock-decoupling and -coupling buffer and methodology and system implementation has been described. While foregoing is directed to the preferred embodiment of the present invention, other and further embodiments of the invention may be devised without departing from the basic scope thereof, and the scope thereof is determined by the claims that follow.

The invention claimed is:

1. A temporary storage device, comprising:
 a first buffer, the first buffer configured to receive information, the information provided in association with a line clock signal, the first buffer configured to receive a first write enable signal for storing a first portion of the information;
 a second buffer, the second buffer configured to receive the information, the information provided in association with the line clock signal, the second buffer configured to receive a second write enable signal for storing a second portion of the information different from the first portion of the information;
 a system clock signal provided to the first buffer and the second buffer for synchronously clocking out the first portion and the second portion of the information; and
 a pointer processor coupled to the first buffer to receive the first portion of the information, the pointer processor having a third buffer for storing the first portion of the information.

2. The temporary storage device of claim 1 further comprising coupled between the first buffer and the pointer processor, a first reader coupled to receive the first portion of the information from the first buffer and configured to provide a first read enable signal to the first buffer and to provide the first information to the pointer processor.

3. The temporary storage device of claim 2 further comprising:
 combinatorial logic configured to provide the first write enable signal, the combinatorial logic configured to provide the first write enable signal in part when selected overhead signals are active;
 an overhead extractor-processor configured to receive the second portion of the information; and
 a second reader coupled between the overhead extractor-processor and the second buffer, the second reader coupled to receive the second portion of the information from the second buffer and configured to provide a second read enable signal to the second buffer and to provide the second portion of the information to the overhead extractor-processor.

4. The temporary storage device of claim 1 wherein the first portion of the information synchronously outputted from the first buffer consists of H1-pointer, H2-pointer and H3-pointer information and a synchronous payload envelope.

5. The temporary storage device of claim 1 wherein the second portion of the information synchronously outputted from the second buffer consists of section overhead or line overhead or a combination thereof or consists of regenerator section or multiplex section overhead or a combination thereof.

6. The temporary storage device of claim 1 wherein the second write enable signal is a transport overhead signal or a section overhead signal.

7. The temporary storage device of claim 6 wherein the second write enable signal is active for providing available columns.

8. The temporary storage device of claim 1 wherein the first portion of the information or the second portion of the information is tagged.

9. The temporary storage device of claim 1 wherein the first portion of the information or the second portion of the information is tagged with an H1-pointer byte.

10. A network node comprising:
a receive line interface configured to receive at least one transmission;
buffers configured to decouple a line clock signal from input data and to couple a system clock signal to first and second output data; and
a pointer core coupled to receive the first output data from a first buffer of the buffers synchronous to the system clock signal, the pointer core having a pointer core associated buffer configured for synchronous operation with the system clock signal on an input and an output side;
a first buffer configured to receive a first portion of the input data; and
a second buffer configured to receive a second portion of the input data
that is different from the first portion.

11. The network node of claim 10 further comprising:
an overhead extractor-processor coupled to receive the second output data from a second buffer of the buffers synchronous to the system clock signal.

12. The network node of claim 11 further comprising:
a first multiplexer coupled to receive the first output data from the first buffer and to provide the first output data to the pointer core; and
a second multiplexer coupled to receive the second output data from the second buffer and to provide the second output data to the overhead extractor processor.

13. The network node of claim 12 wherein the multiplexers are round-robin readers clocked by the system clock signal.

14. A network node comprising:
a frame timing generator, the frame timing generator configured for synchronous operation off of a system clock signal;
a temporary storage device configured to receive data output from the frame timing generator, the temporary storage device configured to decouple the system clock signal from the data and to couple a line clock signal to the data, the data written to the temporary storage device synchronous to the system clock signal, the data outputted from the temporary storage device synchronous to the line clock signal; and
a pointer core having a buffer, the buffer configured to receive the data output from the temporary storage device, the buffer configured to operate on both an input side and an output side synchronous with the line clock signal;
wherein the temporary storage device includes:
a first buffer configured to receive a first portion of the data output from the frame timing generator; and
a second buffer configured to receive a second portion of the data output from the frame timing generator that is different from the first portion.

15. A network comprising:
a first network node;
a second network node;
a communication link for putting the first network node in communication with the second network node;
the first network node configured with a receive buffer, the receive buffer is located on an input data path in advance of a pointer processor buffer, the receive buffer comprising:
a first buffer, the first buffer configured to receive at least a first portion of the overhead information, the at least a first portion of the overhead information provided in association with a line clock signal, the first buffer configured to store a first portion of the at least a first portion of the overhead information; and
a second buffer, the second buffer configured to receive at least a second portion of the overhead information, the at least a second portion of the overhead information provided in association with a line clock signal, the second buffer configured to store a second portion of the at least a second portion of the overhead information; and
the first buffer and the second buffer coupled to receive a system clock signal and configured to respectively clock out the first and second stored information synchronous to the system clock signal,
wherein the second portion of the overhead information is different from the first portion of the overhead information.

16. A method for avoiding one or more asynchronicities in pointer processing, comprising:
providing a first buffer and a second buffer;
providing a frame structure clocked to a line clock to the first buffer;
providing the frame structure clocked to the line clock to the second buffer;
storing a first portion of the frame structure in the first buffer;
storing a second portion of the frame structure in the second buffer, the second portion different from the first portion;
clocking out the first portion of the frame structure from the first buffer synchronous to a system clock signal;
clocking out the second portion of the frame structure from the second buffer synchronous to the system clock signal;
providing the first portion and the second portion of the frame structure from the first buffer and the second buffer to a pointer processor buffer; and
clocking out with a pulse signal synchronized with the system clock signal the first portion and the second portion of the frame structure from the pointer processor buffer.

17. A network comprising:
a first network node;
a second network node;

a communication link for putting the first network node in communication with the second network node;

the first network node configured with a receive buffer and a transmit buffer, the transmit buffer is located on an input data path in advance of a pointer processor buffer, the transmit buffer comprising:

a frame timing generator; and a temporary storage device configured to receive data output from the frame timing generator, the temporary storage device configured to decouple a system clock signal from the data and to couple a line clock signal to the data, the data written to the temporary storage device synchronous to the system clock signal and outputted from the temporary storage device synchronous to the line clock signal;

wherein the temporary storage device includes:

a first buffer configured to receive a first portion of the data output from the frame timing generator; and a second buffer configured to receive a second portion of the data output from the frame timing generator that is different from the first portion.

18. A temporary storage device configured to receive overhead information and data, comprising:

a first buffer, the first buffer coupled to receive at least a first portion of the overhead information, the at least a first portion of the overhead information provided in association with a line clock signal, the first buffer configured to store the at least a first portion of the overhead information to provide first stored overhead information;

a second buffer, the second buffer coupled to receive at least a second portion of the overhead information, the at least a second portion of the overhead information provided in association with the line clock signal, the second buffer configured to store the at least a second portion of the overhead information to provide second stored overhead information;

the first buffer and the second buffer coupled to receive a system clock signal and configured to respectively clock out the first and second stored information synchronous to the system clock signal, wherein the second portion of the overhead information is different from the first portion of the overhead information; and a pointer processor coupled to receive the first stored overhead information, the pointer processor having a third buffer for storing the first stored overhead information.

19. The temporary storage device of claim 18 further comprising a first reader coupled to receive the first stored overhead information from the first buffer and configured to provide a first read enable signal to the first buffer and to provide the first stored overhead information to the pointer processor.

20. The temporary storage device of claim 19 further comprising first combinatorial logic configured to provide a first write enable signal to select the at least a first portion of the overhead information written to the first buffer.

21. The temporary storage device of claim 20 further comprising an overhead extractor-processor coupled to receive the second stored overhead information.

22. The temporary storage device of claim 21 further comprising a second reader coupled to receive the second stored overhead information from the second buffer and configured to provide a second read enable signal to the second buffer and to provide the second stored overhead information to the overhead extractor-processor.

23. The temporary storage device of claim 22 further comprising second combinatorial logic configured to provide a second write enable signal to select the at least a second portion of the overhead information written to the second buffer.

* * * * *